United States Patent
Mobin et al.

(10) Patent No.: US 8,126,039 B2
(45) Date of Patent: Feb. 28, 2012

(54) METHODS AND APPARATUS FOR EVALUATING THE EYE MARGIN OF A COMMUNICATIONS DEVICE USING A DATA EYE MONITOR

(75) Inventors: Mohammad S. Mobin, Orefield, PA (US); Gregory W. Sheets, Bangor, PA (US); Lane A. Smith, Easton, PA (US); Craig B. Ziemer, Fleetwood, PA (US)

(73) Assignee: Agere Systems Inc., Allentown, PA (US)

( * ) Notice: Subject to any disclaimer, the term of this patent is extended or adjusted under 35 U.S.C. 154(b) by 859 days.

(21) Appl. No.: 11/434,688

(22) Filed: May 16, 2006

(65) Prior Publication Data
US 2007/0268962 A1 Nov. 22, 2007

(51) Int. Cl.
*H04B 3/46* (2006.01)
(52) U.S. Cl. ........ 375/224; 375/226; 375/348; 375/371; 375/373; 375/375; 375/376
(58) Field of Classification Search .......... 375/226, 375/345, 348, 355, 371, 375–376
See application file for complete search history.

(56) References Cited

U.S. PATENT DOCUMENTS

| | | | |
|---|---|---|---|
| 6,526,109 B1* | 2/2003 | Chang et al. | 375/371 |
| 2002/0085656 A1* | 7/2002 | Lee et al. | 375/355 |
| 2004/0066867 A1* | 4/2004 | Fujimori et al. | 375/348 |
| 2004/0125874 A1* | 7/2004 | Baumert | 375/226 |
| 2005/0046490 A1* | 3/2005 | Jasa et al. | 331/25 |
| 2005/0108600 A1* | 5/2005 | Arguelles | 714/701 |
| 2005/0238093 A1 | 10/2005 | Payne et al. | |
| 2006/0140321 A1 | 6/2006 | Tell et al. | |
| 2008/0005629 A1 | 1/2008 | Windler et al. | |
| 2008/0310495 A1 | 12/2008 | Bulzacchelli et al. | |

* cited by examiner

*Primary Examiner* — Khanh C Tran
*Assistant Examiner* — Eboni Hughes
(74) *Attorney, Agent, or Firm* — Ryan, Mason & Lewis, LLP

(57) ABSTRACT

Methods and apparatus are provided for evaluating the eye margin of a communications device using a data eye monitor. The quality of a data eye associated with a signal is evaluated by sampling the signal for a plurality of different phases; evaluating the samples to evaluate one or more of a height and width of the data eye; and determining whether the one or more of the height and width satisfy one or more predefined criteria. One or more parameters of the communications device can optionally be adjusted if the communications device does not satisfy the one or more predefined criteria. The communications device can optionally be assigned to a quality category based on the evaluation. A phase offset between a first clock signal used to sample the signal and one or more clocks used to sample data is reduced.

22 Claims, 5 Drawing Sheets

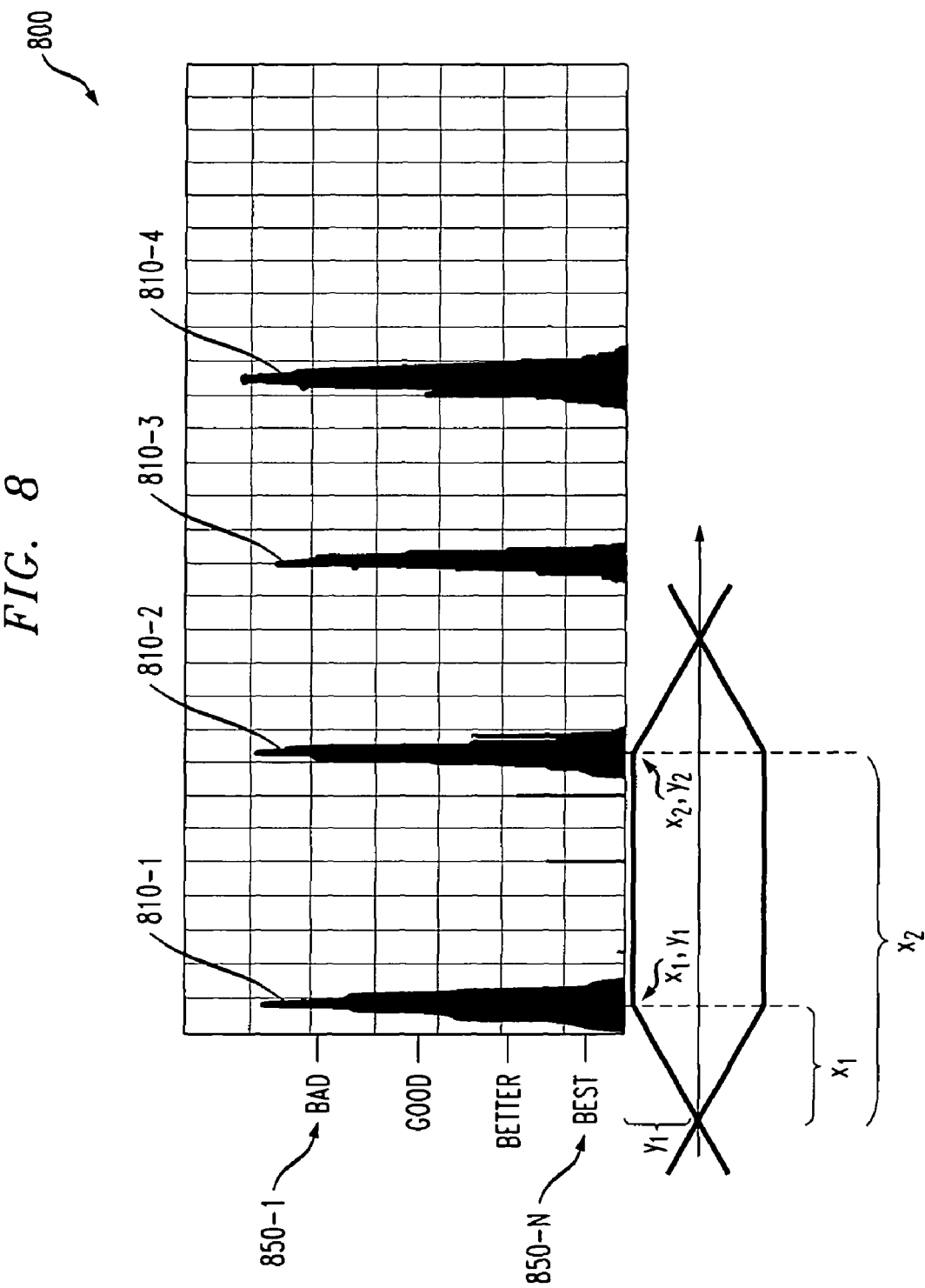

METHODS AND APPARATUS FOR EVALUATING THE EYE MARGIN OF A COMMUNICATIONS DEVICE USING A DATA EYE MONITOR

CROSS REFERENCE TO RELATED APPLICATIONS

The present application is related to U.S. patent application Ser. No. 11/434,686, entitled "Method and Apparatus for Measuring Duty Cycle Based on Data Eye Monitor," and U.S. patent application Ser. No. 11/434,687, entitled "Method and Apparatus for Determining One or More Channel Compensation Parameters Based on Data Eye Monitoring," each filed contemporaneously herewith and incorporated by reference herein.

FIELD OF THE INVENTION

The present invention is related to techniques for evaluating the quality of a communications device and, more particularly, to techniques for evaluating the eye margin of a communications device using a data eye monitor.

BACKGROUND OF THE INVENTION

Digital communication receivers sample an incoming waveform and then reliably detect the sampled data. Typically, a receiver includes a Clock and Data Recovery (CDR) system to recover the clock and data from an incoming data stream. The CDR system generates a clock signal having the same frequency and phase as the incoming signal, which is then used to sample the received signal and detect the transmitted data.

The quality of the received signal is often impaired by intersymbol interference (ISI), crosstalk, echo, and other noise. In addition, impairments in the receiver itself may further degrade the quality of the received signal. The received signal can be viewed as a well-known "data eye," which is a superposition of a number of impaired individual signals with varying frequency components, for example, due to ISI and other noise. As the various impairments increase, the quality of the data eye associated with the received signal is impaired. An important characteristic in the recovery process is the height and width of the data eye. Generally, as the number of frequency components associated with the received signal increases, the data eye becomes less open. The accuracy of the data detection significantly degrades as the data eye becomes less open.

"Eye margining" is a technique by which the height and width, or margins, of a data eye can be measured. The eye margin of a receiver can be evaluated following the manufacturing process, or prior to deployment in a given application, to determine if the receiver satisfies one or more predefined margin criteria. If the receiver does not satisfy the one or more predefined margin criteria, the device can be rejected or one or more device parameters can be modified and the margin criteria can be reevaluated. Eye margining is often performed using a classical jitter tolerance technique and eye histogram techniques.

A need therefore exists for automated methods and apparatus for evaluating the eye margin of a communications device. A further need exists for methods and apparatus for evaluating the eye margin of a communications device using a data eye monitor.

SUMMARY OF THE INVENTION

Generally, methods and apparatus are provided for evaluating the eye margin of a communications device using a data eye monitor. According to one aspect of the invention, the quality of a data eye associated with a signal is evaluated by sampling the signal for a plurality of different phases; evaluating the samples to evaluate one or more of a height and width of the data eye; and determining whether the one or more of the height and width satisfy one or more predefined criteria. One or more parameters of the communications device can optionally be adjusted if the communications device does not satisfy the one or more predefined criteria. The communications device can optionally be assigned to a quality category based on the evaluation.

The one or more predefined criteria provide thresholds that specify a minimum degree of openness for the data eye. The duration of a data eye can be obtained by evaluating a duration of samples taken within the data eye. According to another aspect of the invention, a phase offset between a first clock signal used to sample the signal and one or more clocks used to sample data is reduced.

In one exemplary implementation, one latch is fixed approximately in a center of a data eye associated with the signal and at least a second latch can be repositioned based on the phase to sample the signal along a time axis. In addition, one latch can be fixed approximately in a center of a data eye associated with the signal and at least a second latch can be repositioned based on a voltage threshold setting to sample the signal along an amplitude axis.

A more complete understanding of the present invention, as well as further features and advantages of the present invention, will be obtained by reference to the following detailed description and drawings.

BRIEF DESCRIPTION OF THE DRAWINGS

FIG. 8 is a histogram of the output of the XOR of FIG. 7 that processes the horizontal roaming latch.

DETAILED DESCRIPTION

Figure 1:
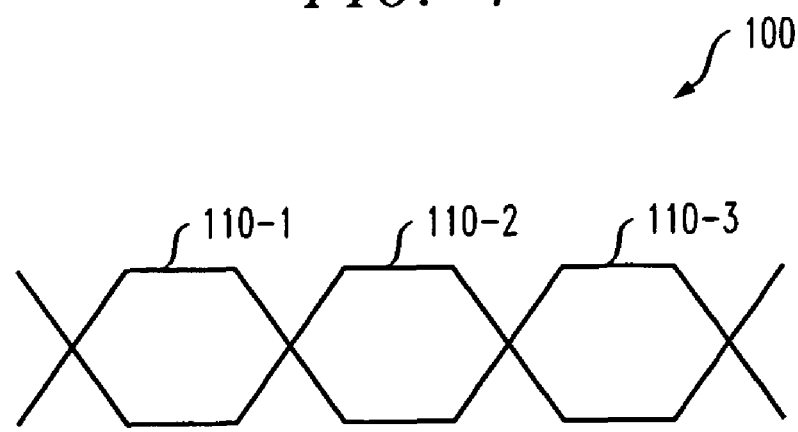
FIG. 1 graphically illustrates a number of ideal data eyes associated with a signal.
Figure 2:
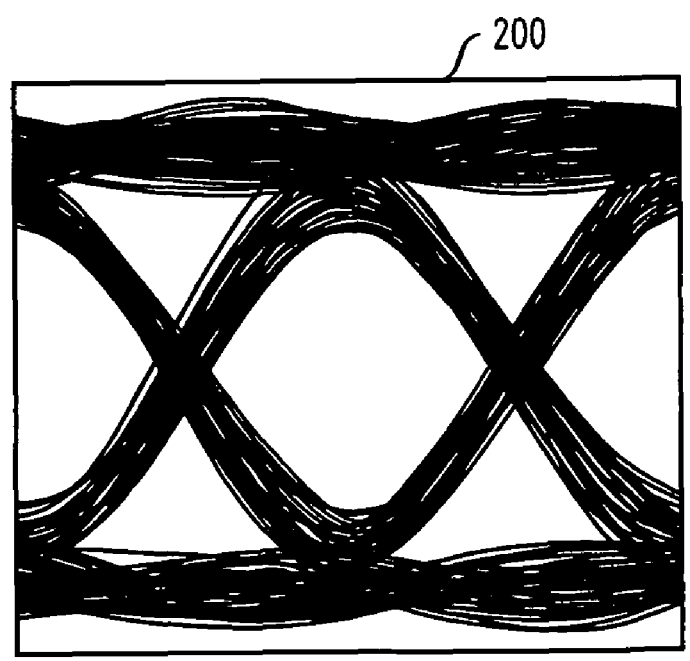
FIG. 2 illustrates an exemplary data eye that exhibits impairments from the channel or the communication device itself.

The present invention provides methods and apparatus for evaluating the eye margin of a communications device using a data eye monitor. FIG. 1 graphically illustrates a number of ideal data eyes 110-1 through 110-3 associated with a signal 100. Although the ideal data eyes 110 shown in FIG. 1 do not exhibit any quality impairments for ease of illustration, each data eye 110 is typically a superposition of a number of individual signals with varying frequency components, in a known manner. FIG. 2 illustrates an exemplary data eye 200 that exhibits limited signal spread due to limited intersymbol interference from the channel or the communication device itself.

According to one aspect of the present invention, two or more latches are used to sample each data eye 110. The samples can be processed to determine the height or width (or both) of the data eye 110. The various samples are obtained using the latches by varying the clock timing and threshold voltage of the latches to several predetermined values.

The measured margin values can then be compared to one or more margin thresholds to determine if the communications device satisfies the margin criteria. In one embodiment, the measured margin values are compared to the margin thresholds to determine if the communications device passes or fails the margin test. In a further variation, if the communication device initially fails the margin test, then one or more parameters, such as preamplifier gain or preamplifier equalization are adjusted and the eye margin is reevaluated. In yet another variation, a plurality of eye margin thresholds are established, and the measured margin values are used to classify the communications device into a corresponding margin quality "bin" to indicate, for example, very good, medium, poor or fail classifications of the devices.

Figure 3:
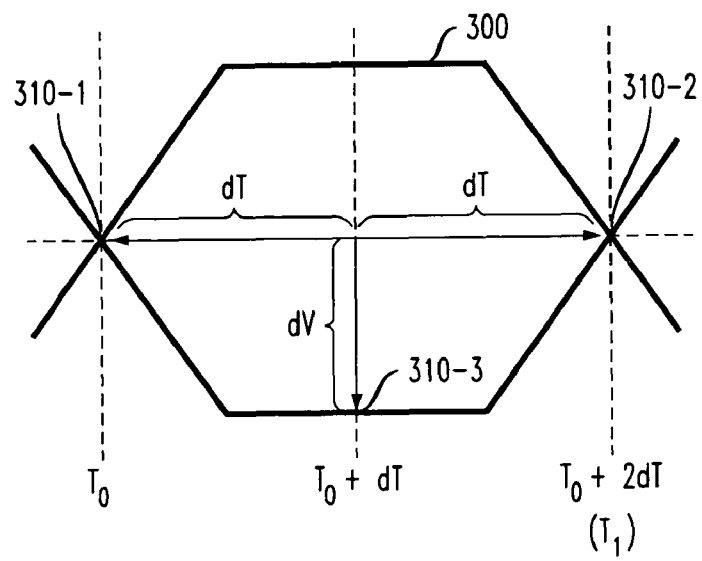
FIG. 3 illustrates one exemplary embodiment for evaluating the margin of a data eye of a communications device in accordance with the present invention.

FIG. 3 illustrates one exemplary embodiment for evaluating the margin of a data eye 300 of a communications device in accordance with the present invention. In the exemplary embodiment shown in FIG. 3, the height and width of the data eye 300 are estimated by measuring three points 310-1 through 310-3 of the eye 300. As discussed further below in conjunction with FIGS. 5 through 7, the three points 310-1 through 310-3 are measured using a plurality of latches associated with a margining latch 700.

As shown in FIG. 3, the first point 310-1 is assumed to occur at a time, $T_0$. The second point 310-2 is assumed to occur at a time, $T_1$. The difference between time $T_1$ and $T_0$ corresponds to the unit interval (UI) or width of the data eye 300. In addition, the third point 310-3 allows the amplitude opening (height), dV, of the data eye 300 to be evaluated. In one exemplary embodiment, discussed further below in conjunction with FIG. 8, the difference between time $T_1$ and $T_0$ is obtained by measuring the peak-to-peak difference in a histogram 800. The histogram values are compared against predefined thresholds to determine an appropriate bin for the device. Similarly, the amplitude opening (height), dV, of the data eye 300 is also obtained by processing the histogram information. As discussed below, the histogram 800 shows the number of hits (output state change) on the margining latch for the three phases of clock timing, and two threshold voltages of the three sample points 310-1 through 310-3.

Figure 4:
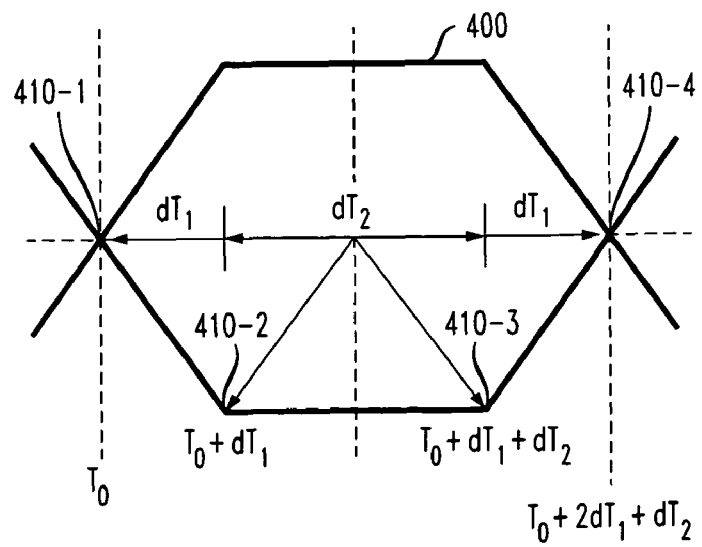
FIG. 4 illustrates an alternate embodiment for evaluating the margin of a data eye associated with a communications device in accordance with the present invention.

FIG. 4 illustrates an alternate embodiment for evaluating the margin of a data eye 400 associated with a communications device in accordance with the present invention. In the exemplary embodiment shown in FIG. 4, the height and width of the data eye 400 are estimated by measuring four points 410-1 through 410-4 of the eye 400. As discussed further below in conjunction with FIGS. 5 through 7, the four points 410-1 through 410-4 are measured using a plurality of latches associated with a margining latch 700.

As shown in FIG. 4, the first point 410-1 is assumed to occur at a time, $T_0$. The second point 410-2 is assumed to occur at a time, $T_0 + dT_1$. The third point 410-3 occurs at a time, $T_0 + dT_1 + dT_2$. Finally, the fourth point 410-4 occurs at a time, $T_0 + 2dT_1 + dT_2$. The difference in time between the first and fourth points 410-1, 410-4 corresponds to the unit interval (UI) or width of the data eye 400. In addition, the second and third points 410-2 and 410-3 allow the amplitude opening (height), dV, of the data eye 400 to be evaluated. In one exemplary embodiment, discussed further below in conjunction with FIG. 8, the difference between time $T_1$ and $T_0$ can again be obtained by measuring the peak-to-peak difference in a histogram 800. The histogram values are compared against predefined thresholds to determine an appropriate bin for the device. Similarly, the amplitude opening (height), dV, of the data eye 400 is also obtained by processing the histogram information. In one implementation discussed below in conjunction with FIG. 6, the amplitude of the signal 110 can be determined based on the relative measurements of two latches 620-fixed and 620-vertical roam (V roam). The two latches 620-fixed and 620-vroam are used to determine the upper and lower bounds of the signal.

Figure 5:
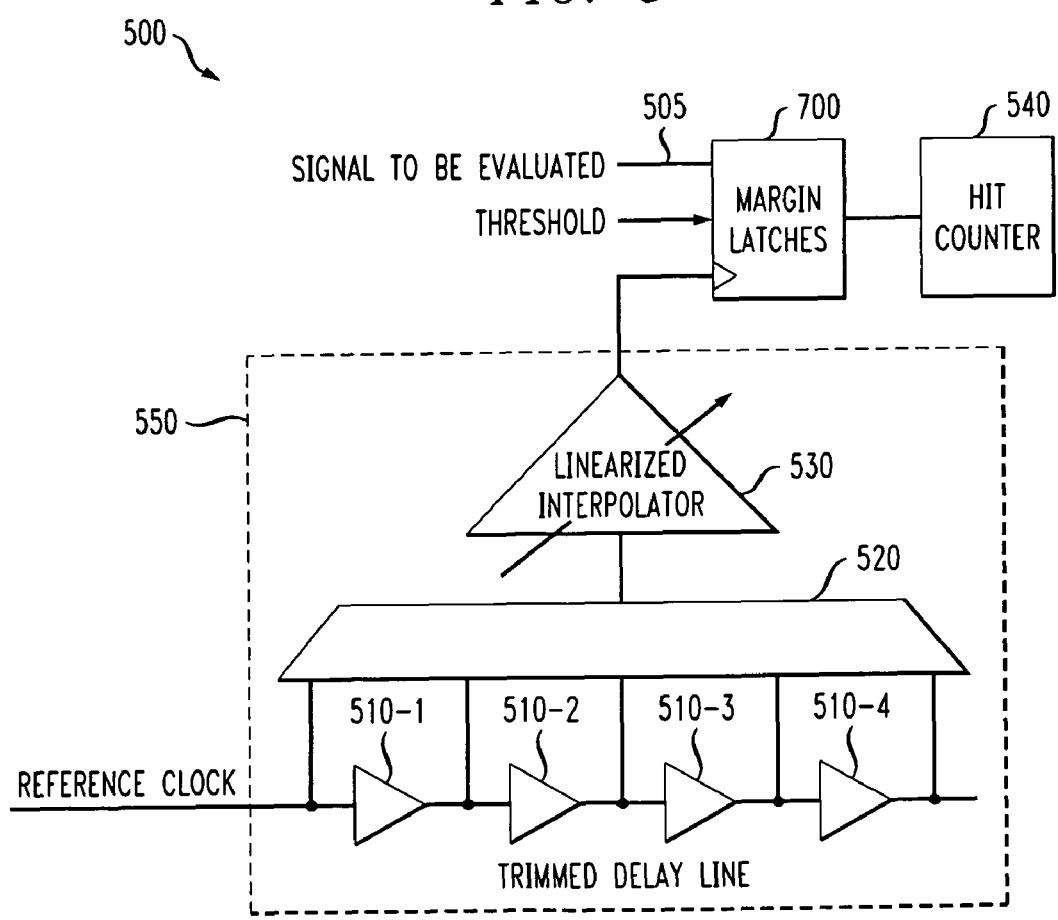
FIG. 5 is a schematic block diagram of an eye margining monitor incorporating features of the present invention.

FIG. 5 is a schematic block diagram of an eye margining monitor 500 incorporating features of the present invention. In the embodiment shown in FIG. 5, the eye margin of a signal 505 is evaluated. The signal 505 may be a clock signal or may contain random data and is applied to the data input of a margining latch 700.

A source of phase controlled data is applied to the clock input of the margining latch 700, discussed below in conjunction with FIG. 7. The source of phase controlled data may be an interpolation circuit 550, such as those described in, for example, U.S. patent application Ser. No. 11/020,021, entitled, "Phase Interpolator Having a Phase Jump," incorporated by reference herein. Generally, the interpolation circuit 550 comprises a trimmed delay line 510 having an exemplary four delay elements 510-1 through 510-4 in the exemplary embodiment. The output of each delay element 510-1 through 510-4 has a phase offset relative to one another, in a known manner. The delay elements in the delay line 510 produce multiple clock phases that can be interpolated so that any phase within the period of the clock signal can be selected.

In the exemplary embodiment shown in FIG. 5, the delay line 510 can be tapped at the output of the four delay elements 510 to provide four corresponding interpolation regions. Each region is separately selected by a multiplexer 520 and separately interpolated by the interpolator 330, in a known manner. When the boundary of an interpolation region is reached, the interpolator 550 switches to the adjacent region. In the exemplary embodiment of FIG. 5, each region of interpolation spans a portion of the clock signal, and each delay element in the bank 510 provides a delay of 1/N of the period of the clock signal, where N determines the resolution of the interpolator. In one exemplary embodiment, there are two delay elements 510 per data eye 110.

The output of the interpolator 530 is applied to the clock input of the margining latch 700, discussed below in conjunction with FIG. 7. The signal to be evaluated is applied to the data input of the latch 700. A hit counter 540 determines the hit count, as discussed below.

The signal to be margined is evaluated at a time $t_1$ set by the interpolator and the voltage $v_1$ set by the threshold voltage. The hit counter input (XOR of center latch and roaming latch placed at $(t_1, v_1)$ coordinates) produces the histogram shown in FIG. 8. The manner in which the hit count is used for margining is discussed below in conjunction with FIG. 8.

Figure 6:
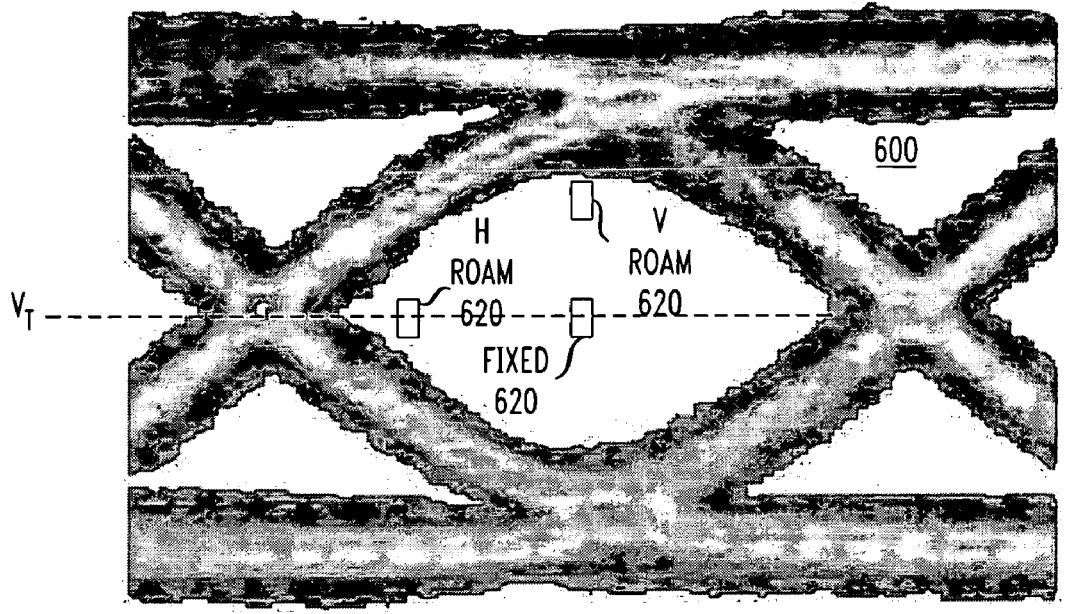
FIG. 6 illustrates the measurement of the height and width of a data eye in accordance with one embodiment of the present invention.

FIG. 6 illustrates the measurement of the height and width of a data eye 600 in accordance with one embodiment of the present invention. As shown in FIG. 6, and discussed further below in conjunction with FIG. 7, the margin latch comprises at least one fixed latch 620-fixed and at least two roaming latches 620-horizontal roam (hroam) and 620-vertical roam (vroam) to measure the height (vertical direction) and width (horizontal direction) of each data eye 600. Generally, the two latches 620-fixed and 620-hroam are used to determine the duration of the eye opening, using the histogram information 800. In addition, the two latches 620-fixed and 620-vroam are used to determine the height of the eye 600, using the histogram information 800.

The fixed latch 620-fixed is fixed at approximately the center of each eye 600 with respect to time (horizontal direction) and voltage threshold (vertical direction). The first roaming latch 620-hroam samples the signal along the time domain based on the roaming clock. In addition, the number of "hits" (e.g., the number of times the samples obtained by the two latches 620-fixed and 620-hroam do not match) can be counted as the margin quality, as discussed below. Generally, in one exemplary embodiment, a "hit" occurs whenever the two latches 620-fixed and 620-hroam do not measure the same value. In this manner, a hit occurs when the roaming latch 620-hroam is in a zero crossing point.

The second roaming latch 620-vroam samples the signal along the vertical (voltage) axis based on the applied voltage threshold setting. The number of "hits" (e.g., the number of times the samples obtained by the two latches 620-fixed and 620-vroam do not match) can be counted and used as a measure of the height of each eye 600. Generally, in one exemplary embodiment, a "hit" occurs whenever the two latches 620-fixed and 620-vroam do not measure the same value. In this manner, a hit occurs when the roaming latch 620-vroam is along the eye boundary or outside the eye.

Figure 7:
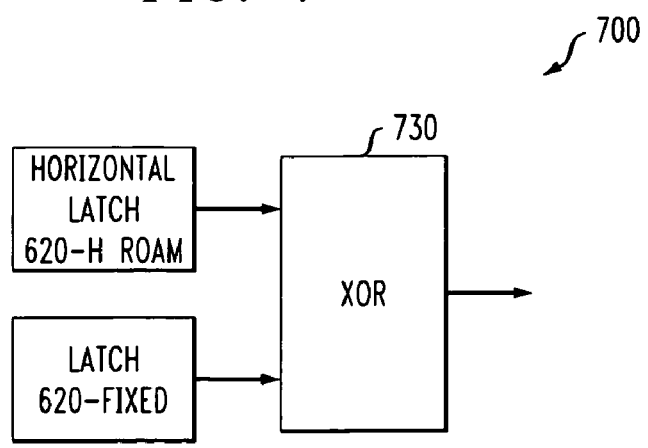
FIG. 7 illustrates one embodiment of the two of the latches of FIG. 6.

FIG. 7 illustrates one embodiment of the two of the latches of FIG. 6. As shown in FIG. 7, the outputs of the two latches 620-fixed and 620-hroam of FIG. 6 are applied to an exclusive OR (XOR) gate 730. The XOR gate 730 compares the value of the two latches 620-fixed and 620-hroam. If the values of the two latches 620-fixed and 620-hroam match, the XOR gate 730 will generate a binary value of 0 and if the values of the two latches 620-fixed and 620 -hroam do not match, the XOR gate 730 will generate a binary value of 1. Thus, a "hit" occurs in the exemplary embodiment when the values of the two latches 620-fixed and 620-hroam do not match.

The relative values of the two latches 620-fixed and 620-hroam provide an indication of location of the data transitions (i.e., zero crossings). If the two latches 620-fixed and 620-hroam have the same value, they are said to match. Thus, for samples taken inside a data eye, it would be expected that the value of the two latches 620-fixed and 620-hroam match one another. For samples taken along the boundary of the data eye (i.e., in the zero crossing), it would be expected that some of the values of the two latches 620-fixed and 620-hroam will match one another. For samples taken outside a data eye, it would be expected that the values of the two latches 620-fixed and 620-hroam will not match. Thus, the number of samples taken at the target margin level provides an indication of the quality of the margin. The vertical roaming latch 620-vroam can be compared with the fixed latch 620-fixed and processed in a similar manner to the horizontal roaming latch 620-hroam.

The output of the XOR 730 that processes the horizontal roaming latch 620-hroam can be used to generate the histogram 800 shown in FIG. 8. As previously indicated, the XOR 730 will generate a binary value of 0 when the outputs of the two latches 620-fixed and 620-hroam match, and will generate a binary value of 1 when the outputs of the two latches 620-fixed and 620-hroam do not match. Thus, binary values of 1 will be expected when the roaming latch 620-hroam is sampling in the boundary of the eye set at the target margin coordinates (shown as peaks 810-1 through 810-4 in the histogram 800). Similarly, binary values of 0 will be expected when both latches 620 are sampling in a location that is inside the data eye 600 (i.e., for high margin case). The number of samples that occur inside the data eye 600 can be used as an indication of the margin quality.

As shown in FIG. 8, a number of margin thresholds 850-1 through 850-N can be established to classify a device into an appropriate quality bin. For example, threshold 850-N corresponds to the best eye opening. At this eye quality, the hit count at coordinate $(x_1, y_1)$ is approximately zero. For the "better" threshold, the hit count is small. Threshold 850-1 corresponds to a failing device where the hit count exceeds the predefined threshold for "bad" devices.

Similarly, the output of the XOR (now shown) that processes the vertical roaming latch 620-vroam can be used to generate another histogram (not shown). The number of samples that occur inside the data eye 600 can be used as an indication of the height of the data eye of the signal.

Another aspect of the present invention recognizes that the clock that drives the margining latch 700 follows a different path than the clocks that are used to sample the data (i.e., through the multiplexer 520 and interpolator 530). Thus, a phase offset may be present between the two signals. Thus, the present invention also provides a method that measures and utilizes a phase offset correction factor between the timing of a data eye to be margined and the clock timing of the margining latch 700. If the clock timing of the margining latch 700 is not synchronized to the data eye 600, the predetermined values of timing and threshold will be incorrect, leading to incorrect margining of the data eye 600. By measuring the amount of phase offset between the data eye 600 to be margined and the clock driving the margining latch, a correction factor can be determined. The correction factor can optionally be applied for precise data eye margining and hence improve device yield.

The additional propagation delay through the multiplexer 520 and interpolator 530 will cause the initial point 310-1 having a first phase 0 of the clock that drives the margin latch 700 to be offset from the time $T_0$ transition in the signal by a certain amount of time. This amount of time is referred to as the phase offset correction factor, $T_{CF}$. Once determined, the phase offset correction factor, $T_{CF}$, can be added to the three points 310-1 through 310-3 of FIG. 3, or the four points 410-1 through 410-4 of FIG. 4. Thus, in FIG. 4, $T_0$ is replaced by the phase offset correction factor, $T_{CF}$.

It is noted that by employing additional latches, additional information can be obtained about the quality of the data eye. For example, if a roaming latch is also used in the vertical (amplitude) direction, the present invention can also assess how open the eye is in the vertical direction. In one embodiment, such vertical optimization can provide a secondary consideration that can be used, for example, in the event that different channel distortion parameters provide the same degree of openness in the horizontal (time) direction. The additional latch function can also be achieved by roaming the roaming latch and varying the roaming latch threshold voltage.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for evaluating the quality of a data eye associated with a signal, comprising:
    sampling said signal for a plurality of different phases using an adjustable sampling clock:
    evaluating said samples to evaluate one or more of a voltage and phase of said data eye utilizing a phase offset correction factor, wherein said phase offset correction factor substantially compensates for a phase difference between a reference clock and said adjustable sampling clock created by a deterministic latency of an interpolator in a data eye monitoring circuit; and
    determining whether said one or more of said voltage and phase satisfy one or more predefined criteria, wherein one or more of said steps are performed by a processor.

2. The method of claim 1, further comprising the step of determining if a communications device associated with said data eye satisfies said one or more predefined criteria.

3. The method of claim 2, further comprising the step of adjusting one or more parameters of said communications device if said communications device does not satisfy said one or more predefined criteria.

4. The method of claim 2, further comprising the step of assigning said communications device to a quality category based on said evaluation.

5. The method of claim 1, wherein said one or more predefined criteria provide thresholds that specify a minimum degree of openness for said data eye.

6. The method of claim 1, wherein said sampling step further comprises the step of sampling said received signal using at least two latches.

7. The method of claim 6, wherein one of said latches is fixed approximately in a center of a data eye associated with said signal and at least a second one of said latches can be repositioned based on said phase to sample said signal along a time axis.

8. The method of claim 6, wherein one of said latches is fixed approximately in a center of a data eye associated with said signal and at least a second one of said latches can be repositioned based on a voltage threshold setting to sample said signal along an amplitude axis.

9. The method of claim 6, wherein said signal is inside said data eye when said two latches sample the same value of said signal.

10. The method of claim 1, wherein a duration of said data eye is obtained by evaluating a duration of samples taken within said data eye.

11. The method of claim 1, further comprising the step of compensating for a phase offset between a first clock signal used to sample said signal and one or more clocks used to sample data.

12. A circuit for evaluating the quality of a data eye associated with a signal, comprising:
    one or more latches configured to sample said signal for a plurality of different phases; and
    a data eye margin monitoring circuit configured to:
    evaluate said samples to evaluate one or more of a voltage and phase of said data eye utilizing a phase offset correction factor, wherein said phase offset correction factor substantially compensates for a phase difference between a reference clock and an adjustable sampling clock created by a deterministic latency of an interpolator in said data eye margin monitoring circuit; and
    determine whether said one or more of said voltage and phase satisfy one or more predefined criteria.

13. The circuit of claim 12, wherein said data eye margin monitoring circuit determines if a communications device associated with said data eye satisfies said one or more predefined criteria.

14. The circuit of claim 13, wherein one or more parameters of said communications device are adjusted if said communications device does not satisfy said one or more predefined criteria.

15. The circuit of claim 13, wherein said communications device is assigned to a quality category based on said evaluation.

16. The circuit of claim 12, wherein said one or more predefined criteria provide thresholds that specify a minimum degree of openness for said data eye.

17. The circuit of claim 12, wherein one of said latches is fixed approximately in a center of a data eye associated with said signal and at least a second one of said latches can be repositioned based on said phase to sample said signal along a time axis.

18. The circuit of claim 12, wherein one of said latches is fixed approximately in a center of a data eye associated with said signal and at least a second one of said latches can be repositioned based on a voltage threshold setting to sample said signal along an amplitude axis.

19. The circuit of claim 17, wherein said signal is inside said data eye when said two latches sample the same value of said signal.

20. The circuit of claim 12, wherein a duration of said data eye is obtained by evaluating a duration of samples taken within said data eye.

21. The circuit of claim 12, wherein said data eve margin monitoring circuit is further configured to compensate for a phase offset between a first clock signal used to sample said signal and one or more clocks used to sample data.

22. An integrated circuit, comprising:
    a circuit for evaluating the quality of a data eye associated with a signal, comprising:
    one or more latches configured to sample said signal for a plurality of different phases; and
    a data eye margin monitoring circuit configured to:
    evaluate said samples to evaluate one or more of a voltage and phase of said data eye utilizing a phase offset correction factor, wherein said phase offset correction factor substantially compensates for a phase difference between a reference clock and an adjustable sampling clock created by a deterministic latency of an interpolator in said data eye margin monitoring circuit; and
    determine whether said one or more of said voltage and phase satisfy one or more predefined criteria.

* * * * *